Dec. 22, 1964 R. M. MacINTYRE 3,162,817

CURRENT SWITCHING CIRCUITS

Filed Aug. 13, 1958 2 Sheets-Sheet 1

INVENTOR.
ROBERT M. MacINTYRE

BY

Lester S. Hecht

ATTORNEY.

INVENTOR.
ROBERT M. MacINTYRE
BY
ATTORNEY

United States Patent Office 3,162,817

Patented Dec. 22, 1964

3,162,817
CURRENT SWITCHING CIRCUITS

Robert M. MacIntyre, Gardena, Calif., assignor, by mesne assignments, to The Bunker-Ramo Corporation, Stamford, Conn., a corporation of Delaware Filed Aug. 13, 1958, Ser. No. 754,803
2 Claims. (Cl. 328—91)

This invention relates to current switching circuits and, more particularly, to a highly stable switching circuit which operates with very low level bias signals to control the passage of current to an output point.

In the typical prior art current switching circuit a bilevel control signal is employed to forward bias a switching diode to permit the passage therethrough of a current which may be weighted to represent a particular input signal such as a binary digit. This technique has several inherent limitations. The switching time of the circuit is limited by the amount of time which is required to overcome the effect of distributive capacitance and inductance characterizing the circuit, since the control signals must rise to a predetermined voltage level before the switching action is effective. Another limitation is that a fairly high degree of voltage regulation is required since gradual variations in the level of the power supply may result in spurious actuation on the current switch. That is, the conventional circuit is voltage responsive regardless of the rate of change of the control signal.

The present invention overcomes the above and other disadvantages inherent in the prior art by providing a circuit wherein the current switching action is controlled by very low level voltage bias signals, a typical voltage level being 0.7 volt. In addition, the switching arrangement of the present invention contemplates the use of a storage capacitor in the input circuit for discriminating against input control signals which do not change at the switching rate for which the circuit is designed. The storage capacitor is arranged in a network so that its time constant is small enough to follow slow variations in the level of the control signal, thus nullifying the effect thereof, but large enough to pass the contemplated control signal. Current switching circuits of the invention employing the storage capacitor will herein be referred to as A.C. switches since they are operated at a rate which is within the discharge time constant of the storage capacitor network.

In its general form, the invention comprises a circuit having an input terminal for receiving a reference voltage, a control terminal which receives a low level bias signal, and an output terminal into which or from which current is drawn depending upon the sense of the reference voltage. The control terminal is coupled to a regulating circuit which may also be referred to herein as a current diverting circuit. The regulating circuit establishes low level bias signals as a function of a control signal which is effective through an input circuit, also referred to herein as a means for establishing a bias, or a bias circuit.

The input circuit or bias circuit is responsive to the control signal and determines which way the current flows through the regulating or current diverting circuit. The direction of current through the regulating circuit determines the polarity of the bias signal, which is kept small and substantially constant. This bias signal may be regulated in an appropriate manner through the use of a pair of oppositely poled diodes. In a typical case the cathode of each diode is coupled to the anode of the other diode, one junction thus created is connected to ground and the other junction is coupled to the control terminal of the switch. The diodes are selected from types which have very low forward voltage drop throughout the range of current required to actuate the switch. The bias voltage at the control terminal of the switch can be held within ±.7 volt by using silicon diodes which have an appropriate characteristic. If similar diodes are then utilized in the switch, the circuit may be operated with ground potential at each electrode of the output switching diode so that no current passes therethrough and with a very low forward biasing potential across the output diode when it is conducting. This means that the circuit is caused to operate with extremely low switching voltages and accordingly the effect of capacitance to ground and distributed capacitance and inductance inherent in resistive elements and the diodes themselves is minimized.

The invention may be practiced with a battery for biasing the input circuit so that when the control signal level exceeds a predetermined positive (or negative) point, it becomes effective. It is preferred, however, to employ a storage capacitor in an A.C. operation as previously discussed. In this case the storage capacitor acts as an effective battery during the A.C. operating interval and follows slow variations in the control signal levels so that these variations cannot cause spurious switching of the circuit.

Accordingly, it is an object of the present invention to provide an improved current switching circuit wherein the signals required to actuate the switching operation may be held to a minimum to obviate time lags due to the effect of distributive capacitance and the like.

Another object is to provide a highly stable current switching circuit which is insensitive to relatively slow changes in the control signal levels.

A further object of the invention is to provide an electronic switch wherein bias signals are provided for switching currents to an output diode, the voltage thereacross being varied between very small limits.

A specific object of the invention is to provide means for controlling a diode switching circuit such that the switching levels applied thereto are regulated to a minimum voltage and further so that no change in bias signal levels is caused to disturb the operation of the diode switch when the control signal level does not vary at the prescribed switching rate.

Another specific object of the invention is to employ a storage capacitor in a network in a manner permitting the A.C. operation of a current switching circuit whereby the relatively slow D.-C. variations of an input control signal have no effect upon the circuit.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Figures 1, 2, 2A, 2B, 3, 3A, 3B:
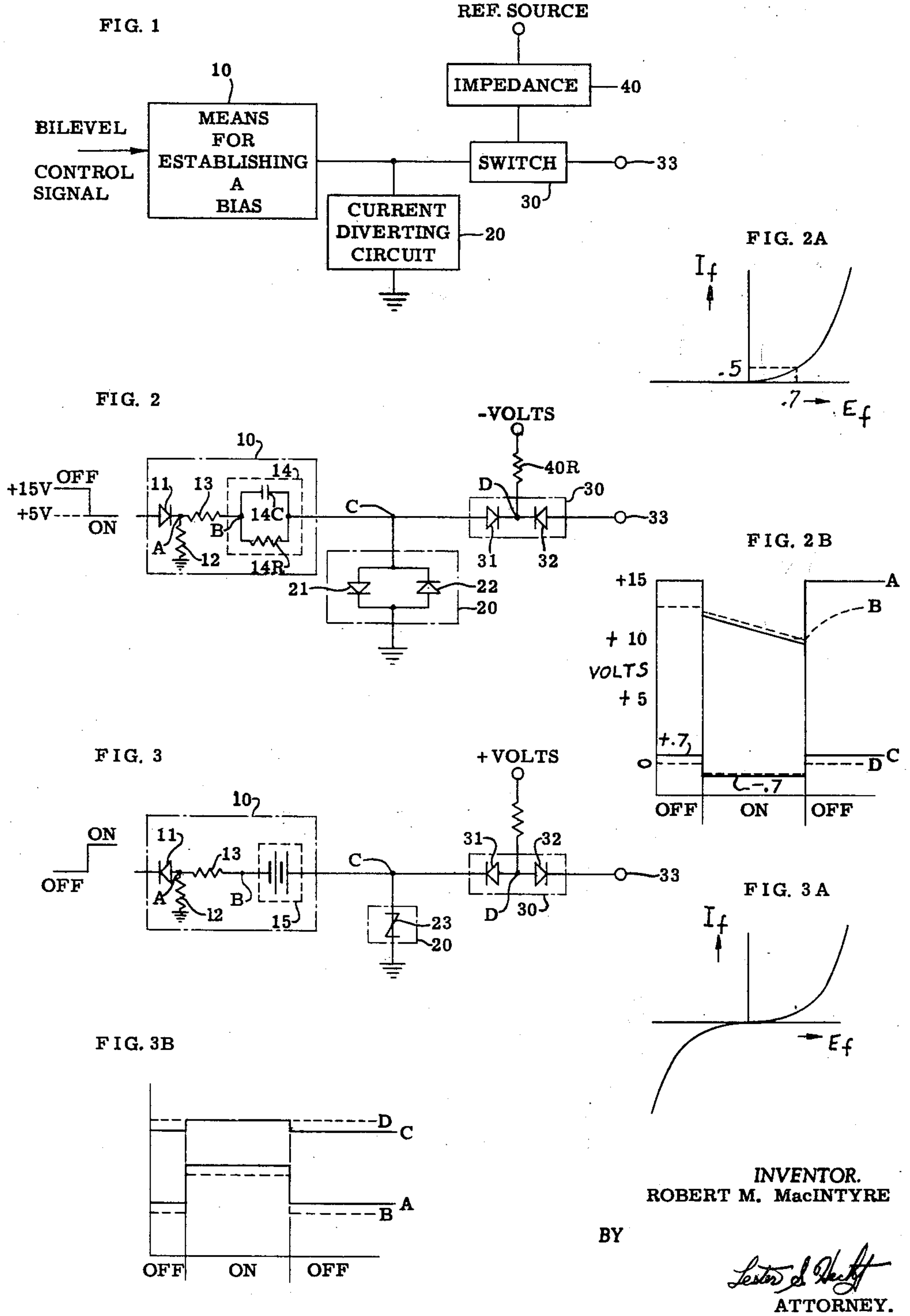
FIG. 1 is a block diagram of a current switching circuit according to the invention.
FIG. 2 is a schematic diagram illustrating one suitable form of each of the various means of the embodiment of FIG. 1.
FIG. 2A is a graph illustrating the characteristics of a silicon diode as may be employed in the embodiment of FIG. 2.
FIG. 2B is a composite set of waveforms illustrating a typical operation of the embodiment of FIG. 2.
FIG. 3 is a schematic diagram illustrating another variation of the various means of the embodiment of FIG. 1.
FIG. 3A is a graph illustrating the characteristic of the non-linear impedance employed in the circuit of FIG. 3.
FIG. 3B is a composite set of waveforms illustrating the operation of the embodiment of FIG. 3.

Referring now to FIG. 1 it will be noted that a bilevel control signal is applied to means 10 which establishes a bias such that current flows in one direction through a current diverting circuit 20 for one level of the bilevel control signal, and current flows in the opposite direction for the other level of the control signal. Circuit 20 also functions to regulate the level of the signal applied to a switch 30 which passes current supplied by a reference source and passed through an impedance 40.

The invention can be best described by considering a specific circuit arrangement such as is shown in FIG. 2. In this embodiment, bias circuit 10 includes an input diode 11 which receives a control signal having a relatively high off-representing level and a relatively low on-representing level. The cathode electrode of diode 11 is connected to a resistor 12, the other end of which is connected to ground, and is also connected to a resistor 13 having its other end connected to a network 14, including a storage capacitor 14C coupled in parallel with a resistor 14R.

Current diverting or regulating circuit 20 is shown as including diodes 21 and 22, the cathode of each diode being connected to the anode of the other. One junction thus created is connected to ground and the other junction is connected to the output lead of circuit 10.

Switch 30 is shown as including a first diode 31 having its anode connected to circuit 10 and its cathode connected to the cathode of a second diode 32 and to a resistor 40R constituting impedance 40 of FIGURE 1. The anode of diode 32 is connected to an output terminal 33 into which current is drawn when the circuit of FIG. 2 is operative in response to the on-representing level of the control signal.

Diodes 21 and 22 are selected to have a characteristic of the type shown in FIG. 2A where it will be noted that a fairly substantial current change $I_f$ may occur before the voltage $E_f$ across the diode becomes very large. Silicon diodes are available, with characteristics as indicated in FIG. 2A, which can supply up to .5 milliamp of current without developing a voltage in excess of .7 volt thereacross.

In the illustrative operation represented by the waveforms in FIG. 2B the control signal varies from an off-representing level above +15 volts to an on-representing level below +5 volts. Thus, when the control signal is at +15 volts the voltage at the cathode of diode 11, represented as A, is at +15 volts. Current then passes through resistors 13 and 14R and through diode 21 to ground. The resistance values are such that this establishes a voltage B at the junction point between resistor 13 and 14R which is approximately 12 volts. Thus capacitor 14C is charged up to this potential.

Since the voltage across diode 21 cannot exceed .7 volt, signal C, applied to diode 31, is sufficient to forward bias this diode; thus, the voltage D at the cathodes of diodes 31 and 32 is approximately at ground potential. If the voltage level at terminal 33 is assumed to be ground potential, both the cathode and anode electrodes of diode 32 are approximately at ground so that no current flows therethrough. That is, current neither flows into or out of terminal 33.

Diodes 21, 22 and 31, 32 have similar voltage current characteristics. The voltage drops (forward conducting) are almost the same for each of diodes 21 and 31 even though the forward currents might not be equal. In practice, the difference in diode forward voltage drops might be as high as 0.1 volt without significantly affecting circuit operation. However, this difference may be kept small by selecting optimum diode currents and diode characteristics. If the diode temperature changes equally for all diodes, the voltage current characteristics shift identically.

When the control signal level falls from +15 to +5 volts, capacitor 14C acts as a battery and draws current through diode 22. The effective potential of capacitor 14C falls as it discharges through resistors 14R, 13 and 12. Thus the waveforms A and B are shown as decreasing in amplitude during the "on" period. This operation must therefore be limited to the time during which capacitor 14C maintains a voltage sufficiently high to keep diode 11 back biased.

In a typical circuit, resistor 14R may be 10K ohms and capacitor 14C may be .04 $\mu$f., while resistors 13 and 12 are 2.2K ohms and 47K ohms, respectively. In this case an "on" period may suitably be 90 $\mu$sec. The "off" period duration is not critical since capacitor 14C may be charged rather rapidly but may be longer than the "on" period due to the switching operation inherent in the time-sharing use of the circuit. For example, in some present applications of the current switching circuit, "off" periods of 100 to 200 $\mu$sec. are encountered.

When diode 22 is caused to conduct the voltage of waveform C falls to a level which is approximately .7 volt below ground, so that diode 31 has a −.7 volt potential at its anode. If the potential at terminal 33 is approximately at ground, diode 32 conducts with a voltage drop of approximately .7 volt so that both anode and cathode electrodes of diode 31 are at .7 volt so that no current passes therethrough. In this case then all of the current passing through resistor 40R is drawn through output terminal 33. Thus, if resistor 40R is selected to have a value representing a desired function of the control signal applied to circuit 10, the current of FIG. 2 derived through terminal 33 may be employed in a decoder of the type shown in FIG. 4 described below.

From the description thus far it should now be apparent that the bias signals which are employed to control the switching of current are regulated to a very low level. In particular, the voltage across diode 32 is either zero volts when the diode is cut off and no current passes therethrough, or is .7 volt, and diode 31 is operated in a similar manner.

In addition the circuit of FIG. 2 has the feature of insensitivity to slow variations in the control signal. For example, if the control level is in its off-representing state at approximately 15 volts, and if it falls or rises at a rate which may be followed by the discharge or charge rate of capacitor 14C, diode 11 remains forward biased as long as the off-representing level is above ground and diode 21 remains forward biased. Switch 30 then will not pass any current to output terminal 33. The off-representing level must be at or above that voltage which will cause a current to flow through resistors 13 and 14R equal to that flowing through resistor 40R when point D is at ground potential. The same action occurs if the potential of the off-representing signal rises gradually. When the control signal is in its on-representing state a rise in potential thereof is more critical since capacitor 14C is discharging at the same time. However, if the on-period is small, such as 90 $\mu$sec., a slow variation in the on-representing level will cause no difficulty.

Many other variations are possible in the form of embodiments of the invention. For example, in FIG. 3 the switching diodes of circuit 30 are reversed and the reference source is positive rather than negative. In this case the control signal has a relatively low off-representing level and a relatively high on-representing level. Furthermore, it will be noted in FIG. 3 that a battery 15 is shown to replace network 14 of FIG. 10. Battery 15 serves the same biasing function as capacitor 14C and permits operation over a longer D.C. interval. However the circuit becomes sensitive to any voltage level change in the control signal which would cause the switching of diode 11.

As another variation in structure, current diverting or regulating circuit 20 is shown as including a non-linear resistor 23 which has a current characteristic such as is indicated in FIG. 3A. This element may be made of silicon carbide and is referred to in the art as a thyrite resistor. The operation of the circuit in FIG. 3 is similar to that of circuit 2 except that there is no storage capacitor 14C to discharge. Thus, waveforms A and B will remain constant during the on-period. Bias means 10 will be noted to have the function in all embodiments of the invention of providing a bidirectional current source for forward biasing circuit 20 for one condition of the input control signal and for back biasing circuit 20 for the other condition of the control signal.

In the operation of the embodiment of FIG. 3 the off-representing level of the control signal is effective to cause means 10 to draw current through ground and thyrite resistor 23 causing voltage C to drop. The on-representing level of the control signal back biases diode 11 causing means 10 to act as a source of current in the opposite direction. This operation implies that the control signal levels are such that the potential of battery 15 is less than the off-representing level of the control signal but is more than the on-representing level thereof.

While the current switch provided by the invention may have many applications, it is particularly useful in a decoder for translating digital input signals into a corresponding analoque output signal. In this case a plurality of current switches of the type shown in FIG. 1 are employed, one for each digit of the digital number. Each switch then has current weighting resistor 40R selected so that the current which passes through the switch in response to an on-representing control level corresponds to the weight of the particular digit. Thus in FIG. 4, switches $P_1$ through $P_N$ are associated respectively with digital input control signals of successively higher digital weights. The notation P is employed to identify these switches since positive current is utilized to represent the value of the digit. A second series of switches is provided for supplying negative current to represent a similar set of digital input signals. These switches are referred to as $N_1$ through $N_N$. Each switch includes the basic elements of the embodiment of FIG. 1; a bias means 10; a current diverting circuit 20; a switch 30; and an impedance 40.

It will be noted that two other switching signals are applied to each circuit in addition to the digital input signal. These are: an operation control signal; and a sign control signal. This multiple signal control may be effected by utilizing a plurality of diodes 11 connected in parallel in the same sense, with the cathode electrodes thereof coupled together (in the case of the negative current source) and the anode electrodes arranged to receive respective control signals. In the case of the positive current source the anode electrodes are connected together and the cathode electrodes each receive a respective control signal. When all control signals applied to a circuit assume the on-representing level, the circuit passes a corresponding weighted current. Thus switches $P_1$ through $P_N$ supply current only when the operation control signal indicates a decoding operation is desired through this series of decoders, and when the sign control signal is positive. Furthermore, each circuit must receive a digital input signal indicating that the particular digital place has an on-representing level. In a similar manner, a negative sign signal is applied to each of switches $N_1$ through $N_N$ which also receive the operation control signal and respective digital value signals.

Figure 4:
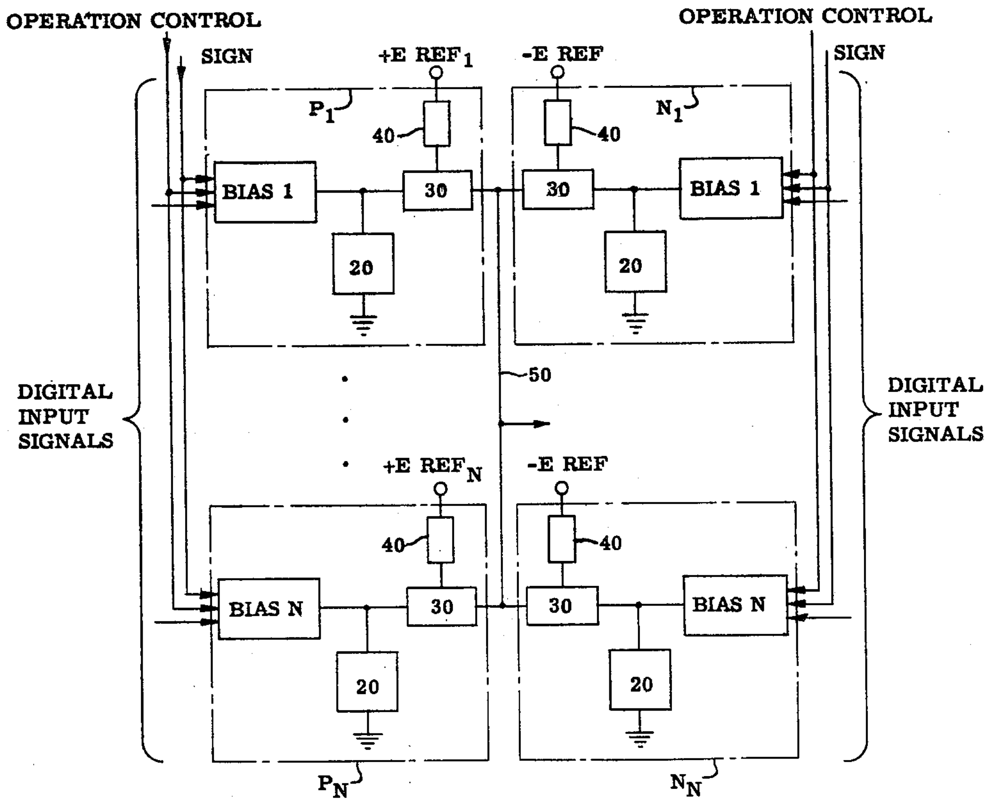
FIG. 4 is a block diagram of a decoder arranged to incorporate the current switches of the invention.

The currents supplied by the various circuits in FIG. 4 are passed to an add line (summing node) 50 which provides an output current which is a summation of all the currents and thus represents the analog equivalent of the digital input number which controls the weighted current passage of the corresponding switches.

Figure 5:
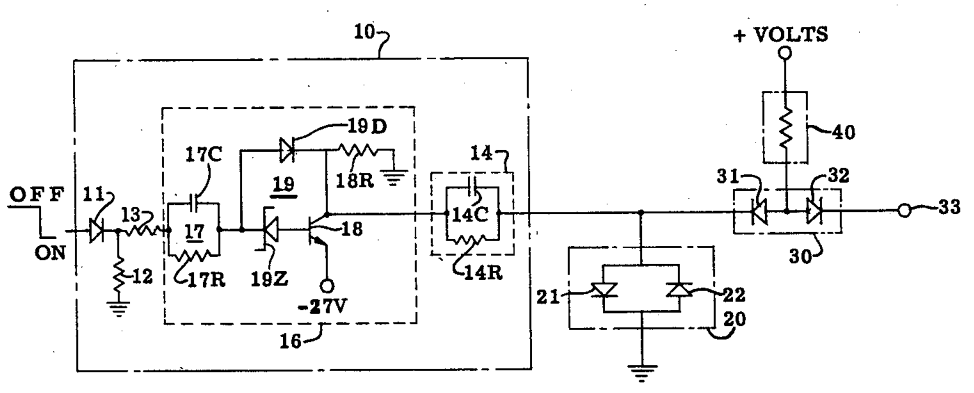
FIG. 5 is a schematic diagram of another form of current switch wherein the input circuit provides inversion.

In the discussion thus far it has been assumed that the control signal representation of FIG. 2 implies one type of circuit and that the opposite control signal configuration of FIG. 3 requires a different arrangement. In particular, FIG. 2 is controlled to provide negative output current, whereas FIG. 3 provides positive output current. However, many other variations are possible, one of which is indicated in FIG. 5 where the control signal configuration of FIG. 2 is utilized to cause the passage of positive output current. In this case means 10 includes an inverting circuit 16 which is conventional in most respects and will be described only briefly.

It may be noted that the input circuit to transistor 18 (resistors 12, 13 and 17R and capacitor 17C) is very similar to circuit 10 of FIG. 2. The function is similar except that now it is driving a transistor instead of circuits 20 and 30.

The function of circuit 16 essentially is to invert the control signal waveform to provide an off-representing low level and an on-representing high level signal which is applied to network 14. In particular, resistor 13 is connected to a network 17 inculding a capacitor 17C and resistor 17R connected in parallel, and functioning essentially as a coupling circuit. The output signal of network 17 is applied to a transistor 18 through an anti-saturation circuit 19 comprising a Zener diode 19Z connected to a conventional diode 19D. Circuit 19 forms no part of the present invention and is fully described in copending patent application by A. D. Scarbrough, Serial No. 642,070, filed February 25, 1957. The collector electrode of transistor 18 is connected to a load resistor 18R, the other end of which is connected to ground.

In operation the high level off-representing control signal causes the conduction of transistor 18 bringing the level of the collector electrode to approximately −27 volts plus the Zener diode drop (about 5 volts), or therefore to −22 volts. This causes the discharge of capacitor 14C in network 14 and causes the drawing of current through diode 22 so that the potential thereacross is approximately −.7 volt at the cathode and diode 31 is caused to conduct biasing off-diode 32 in the manner discussed above. During long off-time, capacitor 14C current ceases and current through diode 22 is drawn through resistor 14R.

The on-representing level of the control signal back biases diode 11 and permits the discharge of capacitor 17C back biasing transistor 18 base-emitter junction. In this case the collector potential of transistor 18 rises toward ground to charge capacitor 14C and cause diode 31 to conduit. The conduction of diode 21 creates a back bias at the cathode diode 31 of approximately .7 volt and causes the forward biasing of diode 32 so that positive current is passed to output terminal 33. In this manner the same type of control signal may cause the passage of other positive or negative current through the use of an inverting amplifier. An amplifier may be inserted into a circuit of the type shown in FIG. 3 in a similar manner so that negative current may be passed to output terminal 33 in response to a low-level control signal.

When the control signal changes from its low value to the high value, resistor 13 limits the maximum current in the circuit—a typical surge limiting resistor application.

However, when the control signal is at its high value, the voltage drop across resistor 13 is about 2.0 volts. For the voltage at point C to change at all, point A must drop about 1.3 volts, hence any high frequency noise at point A less than 1.3 volts amplitude will not be transmitted to point C, to a first approximation. High frequency noise here could be pulses of short duration (compared to the RC time constant of circuit 10). If resistor 13 were omitted, essentially all high frequency pulses, even of small amplitude, say, 0.5 volt, would be transmitted to point C, causing circuit 30 to switch, or partially switch.

From the foregoing description it should now be apparent that the present invention provides improved current switching circuits wherein the voltage required to effect the desired switching is regulated to a minimum. Furthermore, in the preferred arrangement of the invention, a storage capacitor is employed so that an A.C. operation is possible which is substantially insensitive to variations in the level of the control signal which occur at a relatively low rate compared to the capacitor time constant.

While a few species of the invention have been described in detail it will be understood that many other variations are possible and will be developed by those skilled in the art. For example, a wide variety of regulating techniques may be employed following the general concept discussed herein. It has already been established that diode or unilateral devices, such as 21 and 22, may be employed or that a nonlinear resistor 23, such as a thyrite resistor, may be utilized. It is expected, however, that other suitable elements will be employed by those skilled in the art to accomplish the same object.

In addition it is expected that the feature of stability accomplished through the use of a storage element, such as a capacitor, may be accomplished with other elements. The important function is that energy is retained from a previous interval and may be varied to follow relatively slow variations in the control signal level.

Accordingly, it will be understood that the scope of the appended claims is not intended to be limited to the particular species shown herein but is generic to a wide class of circuits employing the various features of the invention.

I claim:

1. In combination, a switch having an input terminal with a reference potential applied thereto, an output terminal, and a control terminal such that when a first bias potential is applied to said control terminal, a current is driven through said output terminal and when a second bias potential is applied to said control terminal, said current is diverted through said control terminal;

a source of bivalued control signals;

a first network including baising means connected to said source of control signals and responsive to first and second values of said bivalued control signal for respectively passing first and second currents in opposite directions therethrough for periods whose durations substantially correspond to the durations of the different valued portions of said bivalued signals;

a second passive network connected in series with said first network remote from said control signal source including means establishing said first and second bias potentials at the junction between said first and second networks corresponding respectively to said first and second currents; and means connecting said control terminal to said junction for operating said switch in accordance with said first and second bias potentials;

said biasing means in said first network comprising a capacitor connected in parallel with an impedance, the time constant of the network being selected to make the circuit substantially insensitive to slowly varying changes in the level of the bivalued control signal.

2. In combination, a switch having an input terminal with a reference potential applied thereto, an output terminal, and a control terminal such that when a first bias potential is applied to said control terminal, a current is driven through said output terminal and when a second bias potential is applied to said control terminal, said current is diverted through said control terminal;

a source of bivalued control signals;

a first network including biasing means connected to said source of control signals and responsive to first and second values of said bivalued control signal for respectively passing first and second currents in opposite directions therethrough for periods whose durations substantially correspond to the durations of the different valued portions of said bivalued signals;

a second passive network connected in series with said first network remote from said control signal source including means establishing said first and second bias potentials at the junction between said first and second networks corresponding respectively to said first and second currents; and means connecting said control terminal to said junction for operating said switch in accordance with said first and second bias potentials;

said biasing means in said first network comprising a low impedance source for establishing a current flow in one direction when the bivalued control signal is at one level and for permitting the flow of current in the opposite direction when the level of the control signal exceeds that of said low impedance source.

References Cited in the file of this patent

UNITED STATES PATENTS

| | | |
|---|---|---|
| 2,122,748 | Mayer | July 5, 1938 |
| 2,576,026 | Meacham | Nov. 20, 1951 |
| 2,657,318 | Rack | Oct. 27, 1953 |
| 2,738,504 | Gray | Mar. 13, 1956 |
| 2,835,867 | Golden | May 20, 1958 |
| 2,841,719 | Radcliffe | July 1, 1958 |
| 2,853,630 | Lane et al. | Sept. 23, 1958 |
| 2,931,025 | Wolcott et al. | Mar. 29, 1960 |
| 2,990,478 | Scarbrough | June 27, 1961 |
| 2,999,173 | Ruck | Sept. 5, 1961 |

OTHER REFERENCES

Korn: Electronic Analog Computers, McGraw-Hill, 2nd Ed., 1956 (page 292 relied on).

"Pulse Techniques," TM 11-672, Dept. of Army, October 1951, pages 25, 26.

"Electron-Tube Circuits," S. Seely, McGraw-Hill Book Co., 1950, pages 415-416.